US011151985B2

(12) United States Patent
Chan et al.

(10) Patent No.: US 11,151,985 B2
(45) Date of Patent: Oct. 19, 2021

(54) SPEECH RECOGNITION WITH ATTENTION-BASED RECURRENT NEURAL NETWORKS

(71) Applicant: Google LLC, Mountain View, CA (US)

(72) Inventors: William Chan, Mountain View, CA (US); Navdeep Jaitly, Mountain View, CA (US); Quoc V. Le, Sunnyvale, CA (US); Oriol Vinyals, London (GB); Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 130 days.

(21) Appl. No.: 16/713,298

(22) Filed: Dec. 13, 2019

(65) Prior Publication Data

US 2020/0118554 A1     Apr. 16, 2020

Related U.S. Application Data

(63) Continuation of application No. 15/970,662, filed on May 3, 2018, now Pat. No. 10,540,962, which is a (Continued)

(51) Int. Cl.
    *G10L 15/16*     (2006.01)
    *G06N 3/04*     (2006.01)
    (Continued)

(52) U.S. Cl.
    CPC .............. *G10L 15/16* (2013.01); *G06F 40/12* (2020.01); *G06F 40/197* (2020.01);
    (Continued)

(58) Field of Classification Search
    CPC .............................. G10L 15/16; G10L 25/30
    See application file for complete search history.

(56) References Cited

U.S. PATENT DOCUMENTS 9,153,231 B1 * 10/2015 Salvador ............... G10L 15/065
9,263,036 B1     2/2016 Graves
(Continued)

FOREIGN PATENT DOCUMENTS

CN     104952448 A     9/2015
WO     2016145850 A1     9/2016

OTHER PUBLICATIONS

Bahdanau et al., "Neural Machine Translation by Jointly Learning to Align and Translate," (Apr. 24, 2015) ronlinel (retrieved from httn://arxiv.orn:/abs/1409.0473), 15 pages.
(Continued)

*Primary Examiner* — Matthew H Baker
(74) *Attorney, Agent, or Firm* — Honigman LLP; Brett A. Krueger (57) ABSTRACT

Methods, systems, and apparatus, including computer programs encoded on computer storage media for speech recognition. One method includes obtaining an input acoustic sequence, the input acoustic sequence representing an utterance, and the input acoustic sequence comprising a respective acoustic feature representation at each of a first number of time steps, processing the input acoustic sequence using a first neural network to convert the input acoustic sequence into an alternative representation for the input acoustic sequence, processing the alternative representation for the input acoustic sequence using an attention-based Recurrent Neural Network (RNN) to generate, for each position in an output sequence order, a set of substring scores that includes a respective substring score for each substring in a set of substrings; and generating a sequence of substrings that represent a transcription of the utterance.

20 Claims, 6 Drawing Sheets

Related U.S. Application Data continuation of application No. 15/788,300, filed on Oct. 19, 2017, now Pat. No. 9,990,918, which is a continuation of application No. 15/055,476, filed on Feb. 26, 2016, now Pat. No. 9,799,327.

(51) Int. Cl.
| | | |
|---|---|---|
| *G06F 40/12* | (2020.01) | |
| *G06F 40/197* | (2020.01) | |
| *G10L 15/183* | (2013.01) | |
| *G10L 15/26* | (2006.01) | |
| *G10L 25/30* | (2013.01) | |

(52) U.S. Cl.
CPC ......... *G06N 3/0445* (2013.01); *G06N 3/0454* (2013.01); *G10L 15/183* (2013.01); *G10L 15/26* (2013.01); *G10L 25/30* (2013.01)

(56) References Cited

U.S. PATENT DOCUMENTS

| | | | |
|---|---|---|---|
| 9,286,897 | B2 | 3/2016 | Bisani et al. |
| 9,484,023 | B2 | 11/2016 | Arisoy et al. |
| 9,524,716 | B2 | 12/2016 | Sethy et al. |
| 9,570,069 | B2 | 2/2017 | Lehman et al. |
| 9,582,753 | B2 | 2/2017 | Hershey et al. |
| 9,600,764 | B1 * | 3/2017 | Rastrow ............... G06N 3/0445 |
| 9,627,532 | B2 | 4/2017 | Gemello et al. |
| 9,653,093 | B1 * | 5/2017 | Matsoukas ............ G10L 15/08 |
| 10,032,463 | B1 * | 7/2018 | Rastrow ............... G10L 15/183 |
| 10,049,106 | B2 * | 8/2018 | Goyal ................ G06N 3/0445 |
| 10,176,802 | B1 * | 1/2019 | Ladhak .................. G10L 15/16 |
| 10,229,672 | B1 | 3/2019 | Rao et al. |
| 2003/0135356 | A1 | 7/2003 | Ying et al. |
| 2004/0215449 | A1 | 10/2004 | Roy |
| 2015/0170640 | A1 | 6/2015 | Sak et al. |
| 2016/0111108 | A1 | 4/2016 | Erdogan et al. |
| 2016/0171974 | A1 | 6/2016 | Hannun et al. |
| 2016/0284347 | A1 | 9/2016 | Sainath et al. |
| 2016/0350646 | A1 | 12/2016 | Leeman-Munk et al. |
| 2018/0261214 | A1 * | 9/2018 | Gehring ................. G06F 40/47 |

OTHER PUBLICATIONS

Chorowski et al., "End-to-End Continuous Speech Recognition using Attention-based Recurrent NN: First Results," (Dec. 4, 2014) [online] (retrieved from httn://arxiv.orn:/abs/1412.1602), 10 pages.

Chorowski et al., "Attention-based Models for Speech Recognition," (Jun. 24, 2015) [online] (retrieved from httn://arxiv.orn/abs/1506.07503), 19 pages.

Graves et al., "Hybrid Speech Recognition with Bidirectional LSTM," Automatic Speech Recognition and Understanding Workshop (ASRU), 2013 IEEE Workshop on., 6 pages.

Graves and Jaitly, "Towards End-to-End Speech Recognition with Recurrent Neural Networks," Proceedings of the 3151International Conference on Machine Leaming (ICML-14), 2014, 9 pages.

Sutskever et al, "Sequence to Sequence Leaming with Neural Networks," (Dec. 14, 2014) [online] (retrieved from htto://arxiv.org/abs/1409.3215), 9 pages.

Sak et al., "Long Short-Term Memory Based Recurrent Neural Network Architectures for Large Vocabulary Speech Recognition," (Feb. 5, 2014) [online] (retrieved from httos://arxiv.org/odf/1402.1128.odf), 5 pages.

Graves et al., "Hybrid Speech Recognition with Deep Bidirectional LSTM," Automatic Speech Recognition and Understanding (ASRU), 2013 IEEE Workshop on. IEEE 2013.

Graves et al., "Speech Recognition with Deep Recurrent Neural Networks," 2013 IEEE International Conference on Acoustics, Speech and Signal Processing, IEEE 2013.

Hannun et al., "Deep Speech: Scaling Up End-to-End Speech Recognition," (Dec. 19, 2014) [online] (retrieved from httos://arxiv.org/pdf/1412.5567.pdf), 12 pages.

* cited by examiner

SPEECH RECOGNITION WITH ATTENTION-BASED RECURRENT NEURAL NETWORKS

CROSS-REFERENCE TO RELATED APPLICATIONS

This U.S. patent application is a continuation of, and claims priority under 35 U.S.C. § 120 from, U.S. patent application Ser. No. 15/970,662, filed on May 3, 2018, which is a continuation of U.S. patent application Ser. No. 15/788,300, filed on Oct. 10, 2017, which is a continuation of U.S. patent application Ser. No. 15/055,476, filed on Feb. 26, 2016. The disclosures of these prior applications are considered part of the disclosure of this application and are hereby incorporated by reference in their entireties.

BACKGROUND

This specification relates to speech recognition using neural networks.

Speech recognition systems receive an acoustic sequence and generate a transcription of an utterance represented by the acoustic sequence. Some speech recognition systems include a pronunciation system, an acoustic modeling system and a language model. The acoustic modeling system generates a phoneme representation of the acoustic sequence, the pronunciation system generates a grapheme representation of the acoustic sequence from the phoneme representation, and the language model generates the transcription of the utterance that is represented by the acoustic sequence from the grapheme representation.

SUMMARY

In general, one innovative aspect of the subject matter described in this specification can be embodied in methods that include the actions of obtaining an input acoustic sequence, the input acoustic sequence representing an utterance, and the input acoustic sequence comprising a respective acoustic feature representation at each of a first number of time steps; processing the input acoustic sequence using a first neural network to convert the input acoustic sequence into an alternative representation for the input acoustic sequence; processing the alternative representation for the input acoustic sequence using an attention-based Recurrent Neural Network (RNN) to generate, for each position in an output sequence order, a set of substring scores that includes a respective substring score for each substring in a set of substrings, and generating a sequence of substrings that represent a transcription of the utterance.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations a substring comprises one or more characters.

In further implementations the set of substrings comprises a set of alphabetic letters which is used to write one or more natural languages.

In other implementations the substrings in the set of substrings further comprise a space character, a comma character, a period character, an apostrophe character, and an unknown character.

In some implementations the generated sequence of substrings begins with a start of sequence token <sos> and ends with an end of sequence token <eos>.

In some cases the alternative representation for the acoustic sequence comprises a respective alternative acoustic feature representation for each of a second number of time steps, wherein the second number is smaller than the first number.

In other cases the first neural network is a pyramid Bidirectional Long Short Term Memory (BLSTM) RNN.

In some implementations processing the input acoustic sequence using a first neural network to convert the input acoustic sequence into an alternative representation for the input acoustic sequence comprises, processing the input acoustic sequence through a bottom BLSTM layer to generate a BLSTM layer output: processing the BLSTM layer output through each a plurality of pyramid BLSTM layers, wherein consecutive outputs of each pyramid BLSTM layer are concatenated before being provided to the next pyramid BLSTM layer.

In other implementations processing the alternative representation for the input acoustic sequence using an attention-based RNN comprises, for an initial position in the output sequence order; processing a placeholder start of sequence token and a placeholder initial attention context vector using the attention-based RNN to update a hidden state of the attention-based RNN from an initial hidden state to a hidden state for the initial position in the output sequence order; generating an attention context vector for the initial position from the alternative representation and the RNN hidden state for the initial position in the output sequence order; and generating the set of substring scores for the initial position using the attention context vector for the initial position and the RNN hidden state for the initial position.

In some cases the method further comprises selecting the highest scoring substring from the set of substring scores as the substring at the initial position in the output sequence of substrings.

In further cases processing the alternative representation for the input acoustic sequence using an attention-based Recurrent Neural Network (RNN) comprises, for each position after the initial position in the output sequence order; processing a substring at the preceding position in the output sequence order and the attention context vector for the preceding position in the order using the attention-based RNN to update the hidden state of the attention-based RNN from the hidden state for the preceding position to a hidden state for the position, generating an attention context vector for the position front the alternative representation and the RNN hidden state for the position in the output sequence order; and generating the set of substring scores for the position using the attention context vector for the position and the RNN hidden state for the position.

In some implementations the method further comprises selecting the highest scoring substring from the set of substring scores for the position as the substring at the position in the output sequence of substrings.

In other implementations generating an attention context vector for the position from the alternative representation and the RNN hidden state for the position in the output sequence order comprises: computing a scalar energy for the position using the alternative representation and the hidden state of the attention-based RNN for the position; converting the computed scalar energy into a probability distribution using a softmax function, and using the probability distribution to create a context vector by combining the alternative representation at different positions.

In some cases generating the set of substring scores for the position using the attention context vector for the position and the RNN hidden state for the position comprises, providing the hidden state of the attention-based RNN for the position and generated attention context vector for the position as input to a multi-layer perception (MLP) with a softmax output layer: processing the hidden state of the attention-based RNN for the position and generated attention context vector for the position using the MLP to generate a set of substring scores for each substring in the set of substrings for the position.

In some implementations the first neural network and attention-based recurrent neural network are trained jointly.

In other implementations processing the alternative representation for the input sequence using an attention-based Recurrent Neural Network (RNN) comprises processing the alternative representation using an attention-based RNN using a left to right beam search decoding.

The subject matter described in this specification can be implemented in particular embodiments so as to realize one or more of the following advantages. A Listen, Attend and Spell (LAS) speech recognition system learns to transcribe speech utterances to characters using next step prediction and is able to learn all the components of a speech recognizer jointly, unlike other speech recognition systems that are not LAS speech recognition systems. In addition, due to the implementation of next step prediction, a LAS speech recognition system can learn to account for accents over the length of an utterance—unlike speech recognition systems that are not LAS speech recognition systems.

A LAS speech recognition system may have a smaller data footprint that other speech recognition systems that are not LAS speech recognition systems since, for example, the LAS system architecture combines components of other, traditional speech recognition systems into one set of parameters. In addition, a LAS speech recognition system does not make assumptions, e.g., conditional independence assumptions, in a label sequence unlike other speech recognition systems that are not next step prediction based, improving speech recognition accuracy.

By directly modeling characters as outputs, a LAS speech recognition system may handle rare and out-of-vocabulary words automatically, since the model outputs a character or substring sequence, one character or substring at a time. In addition, a LAS speech recognition system may generate multiple spelling variants naturally, unlike other speech recognition systems that are not LAS speech recognition systems.

Due to the structure of the LAS speech recognition system, the number of time steps that an attention model has to extract relevant information front is reduced, thus improving computational efficiency whilst maintaining high levels of accuracy. In addition, larger amounts of training data may be used to train the LAS speech recognition system, also improving model accuracy and reliability. The structure of the LAS speech recognition system also enables the model to learn nonlinear feature representations of input data, furthermore, the structure of a LAS speech recognition system reduces the computational complexity of the speech recognition system compared to other speech recognition systems that are not LAS speech recognition systems, which improves the speed of learning and inference processes.

A LAS speech recognition system may not require any pre-training, unlike other speech recognition systems with deep neural networks that are not attention-based, thus improving computational time and resources required for end-to-end speech recognition.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
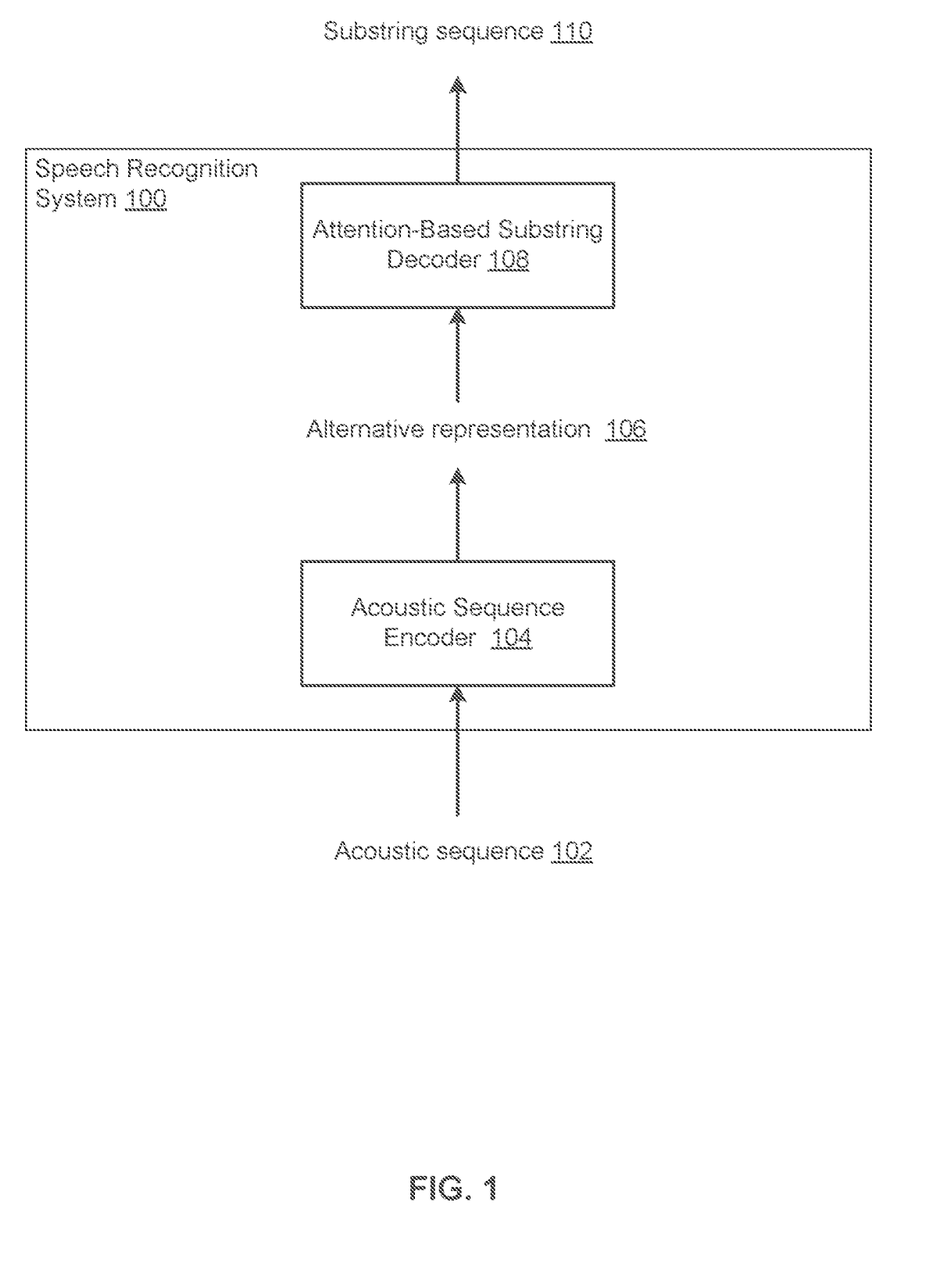
FIG. 1 shows an example speech recognition system.

FIG. 1 shows an example speech recognition system 100 for end-to-end speech recognition implementing listen, attend and spell (LAS). The LAS speech recognition system 100 is an example of a system implemented as computer programs on one or more computers in one or more locations, in which the systems, components, and techniques described below can be implemented.

The LAS speech recognition system 100 obtains input acoustic sequences and processes the input acoustic sequences to generate substring sequences. Each substring sequence is a transcription of the utterance represented by the corresponding input acoustic sequence. For example, the LAS speech recognition system 100 can obtain an input acoustic sequence 102 and generate a corresponding substring sequence 110 that is a transcription of the utterance represented by the input acoustic sequence 102.

The input acoustic sequence 102 may include a sequence of multiple frames of audio data that is a digital representation of an utterance, e.g., a continuous stream of data. The sequence of multiple frames of audio data may correspond to a first set of time steps, e.g., where each frame of audio data is associated with 10 milliseconds of audio stream data. Each frame of audio data in the sequence of multiple frames of audio data may include feature values for the frame that characterizes the utterance at the corresponding time step. For example, the sequence of multiple frames of audio data may include filter bank spectra feature vectors.

The substring sequence 110 may induce a sequence of substrings that are a transcription of the utterance represented by the input acoustic sequence 102. The substrings in the sequence of substrings are members of a set of substrings. A substring may include one or more characters. For example, the set of substrings may be a character set which includes an alphabet of alphabetic letters. The alphabet is a standard set of alphabetic letters which is used to write one or more natural languages, generally because the alphabetic letters represent phonemes in the spoken natural language. For example, the alphabet may be the English alphabet. The character set may also include Arabic numerals, a space character, a comma character, a period character, an apostrophe character, and an unknown character.

The LAS speech recognition system 100 includes an acoustic sequence encoder 104 and an attention-based substring decoder 108. The acoustic sequence encoder 104 processes input acoustic sequences and generates alternative representations for the input acoustic sequences, e.g., an alternative representation 106 for the input acoustic sequence 102. The alternative representation may include an alternative sequence of multiple frames of audio data that correspond to a second set of time steps. In some implementations, the alternative representation for the input acoustic sequence is a high level representation of the input acoustic sequence, i.e., the second set of time steps in the alternative representation is smaller than the first set of time steps in the input acoustic sequence. Generating alternative representations for input acoustic sequences using an acoustic sequence encoder is described below with reference to FIGS. 2 and 5.

The attention-based substring decoder 108 processes alternative representations for input acoustic sequences and generates substring sequences from the alternative representations, e.g., a substring sequence 110 front the alternative representation 106. Generating a substring output using an attention-based substring decoder is described in more detail below with reference to FIGS. 3 and 6.

Figure 2:
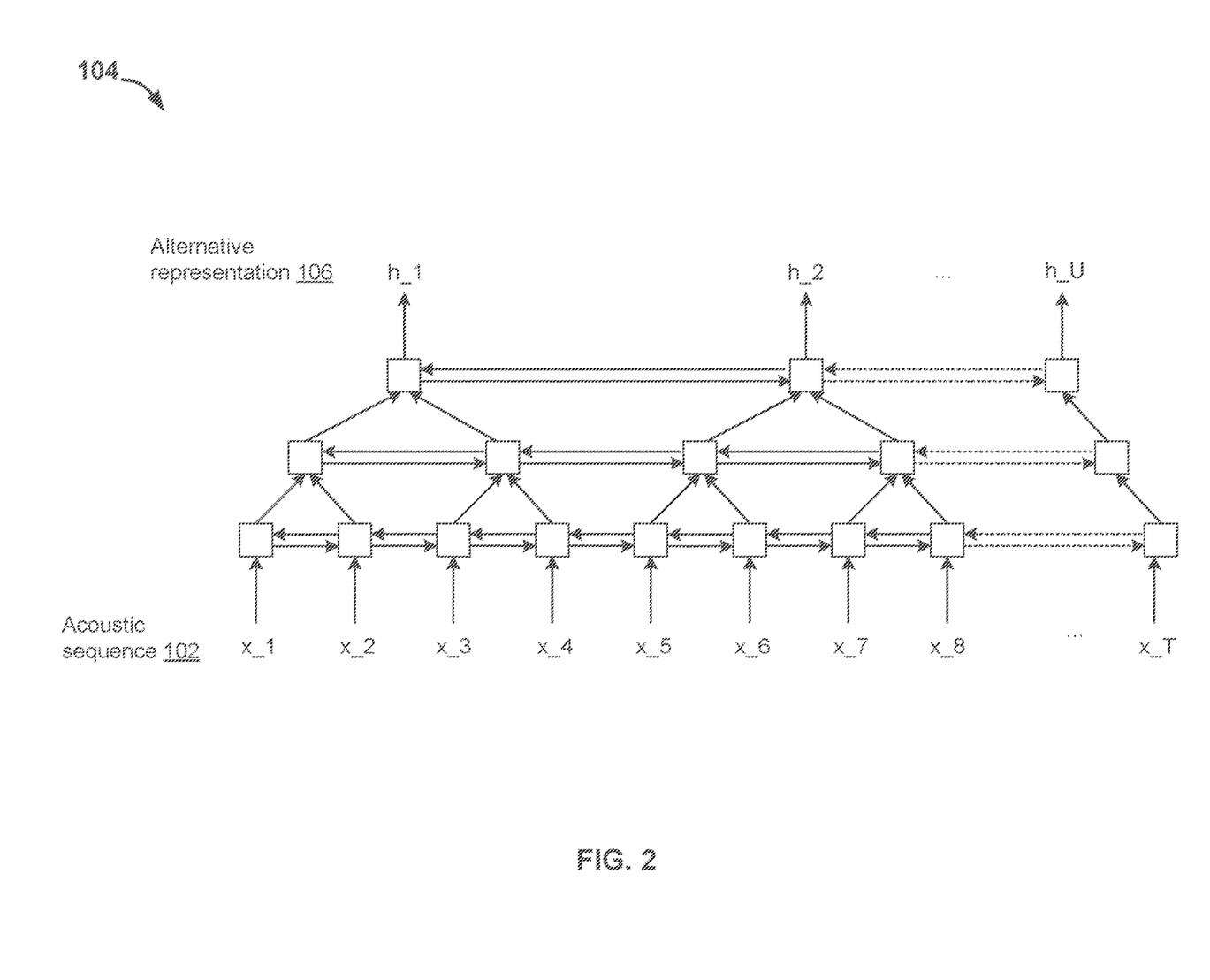
FIG. 2 shows an example acoustic sequence encoder.

FIG. 2 shows an example acoustic sequence encoder 104, as described above with reference to FIG. 1. The acoustic sequence encoder 104 includes a Recurrent Neural Network (RNN) with a pyramid structure. The RNN with pyramid structure includes a bottom layer and one or more pyramid layers. Although only two pyramid layers are shown in FIG. 2 for clarity, in some implementations the RNN with pyramid structure may include a higher number of pyramid layers or a smaller number of pyramid layers. The pyramid layers are arranged in a sequence from a lowest pyramid layer, e.g., the pyramid layer above the bottom layer, to a highest pyramid layer. At each time step, each pyramid layer receives an input from the preceding pyramid layer, or if the pyramid layer is the lowest layer in the sequence of pyramid layers, from the bottom layer. The bottom layer receives an acoustic sequence as input, as described above with reference to FIG. 1. In some implementations the acoustic sequence encoder may include a neural network that is not a RNN, a RNN that is a Bidirectional Long Short Term Memory neural network or a RNN that is a Long Short Term Memory neural network.

The RNN layers can include one or more Bidirectional Long Short Term Memory (BLSTM) neural network layers. A BLSTM neural network layer is a neural network layer that has one or more LSTM memory blocks and that predicts or labels each element of a sequence based on both the past and the future context of the element. An example BLSTM neural network that can be used to process acoustic sequences is described in more detail in "Hybrid Speech Recognition with Bidirectional LSTM," Alex Graves, Navdeep Jaitly, and Abdel-rahman Mohamed, *Automatic Speech Recognition and Understanding Workshop*, 2013.

The RNN with a pyramid structure processes an acoustic sequence $x=(x_1, x_2, \ldots, x_T)$ (102) for the time step using the RNN layers to generate an alternative representation $h=(h_1, h_2, \ldots, h_U)$ (106) for the acoustic sequence. In the RNN with pyramid structure model, the RNN concatenates outputs at consecutive steps of each pyramid layer before providing an output to the next layer. For example, the RNN with a pyramid structure concatenates the output h of a j−1th pyramid BLSTM (pBLSTM) layer at consecutive steps $2i$ and $2i+1$, e.g., $h'_i{}^{j-1}=[h_{2i}{}^{j-1}, h_{2i+1}{}^{j-1}]$ where $i=0, 1, \ldots$, such that the output h of the jth pyramid pBLSTM layer at time step i is given by Equation (1) below.

$$h_i^j = \text{pBLSTM}(h_{i-1}^j, [h_{2i}^{j-1}, h_{2i+1}^{j-1}]) \quad (1)$$

In each successive stacked pyramid RNN layer, the time resolution may therefore be reduced. For example, the time resolution may be reduced $2^l$ times, where l is the number of pyramid layers stacked on top of the bottom layer. Therefore, the alternative representation 106 generated by the RNN for the acoustic sequence 102 has a reduced length, i.e., U<T.

The alternative representation 210 may be provided for further processing, e.g., to an attention-based substring decoder, for end-to-end speech recognition. An example attention-based substring decoder is described in more detail below with reference to FIG. 3.

Figure 3:
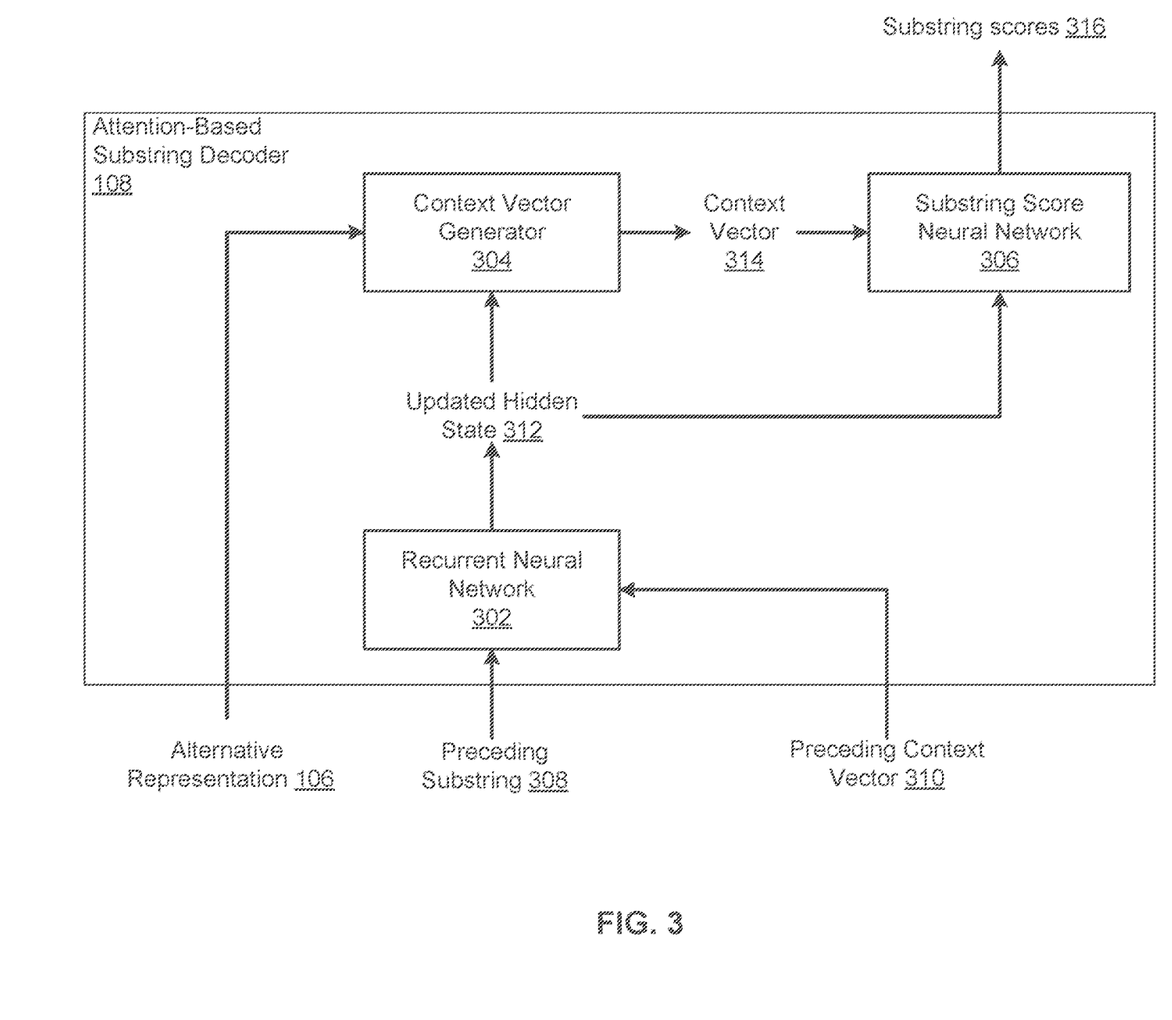
FIG. 3 shows an example attention-based substring decoder.

FIG. 3 shows an example attention-based substring decoder 108, as described above with reference to the speech recognition system 100 of FIG. 1. The attention-based substring decoder 108 includes a Recurrent Neural Network (RNN) 302, a context vector generator 304 and a substring score neural network 306.

The RNN 302 is a neural network that receives an input sequence and maintains an internal state while processing the inputs in the input sequence, e.g., the preceding substring input 308. The preceding substring input 308 may include one or more characters. In particular, the RNN uses some or all of the internal hidden state of the network from processing a preceding input in the input sequence in combination with the current input in the input sequence to update the internal hidden state of the recurrent neural network.

At each time step, the RNN 302 receives as input a preceding substring 308, e.g., a substring output at the time step preceding the current time step, and a preceding context vector, e.g., a context vector corresponding to the time step preceding the current time step. The RNN 302 processes the preceding substring 308 and the preceding context vector 310 to generate as output an updated hidden state of the RNN 312 for the time step, i.e., to update its internal hidden state. Generating an updated hidden state of the RNN is described in more detail below with reference to step 604 in FIG. 6. The RNN 302 provides the updated hidden state 312 for the time step to the context vector generator 304 and to the substring score neural network 306.

The context vector generator 304 receives as input the updated hidden state of the RNN 312 at the time step and the alternative representation 106, i.e., the alternative representation of the acoustic sequence 102 described above with reference to FIG. 1. The context vector generator 304 processes the updated hidden state of the RNN 312 at the time step and the alternative representation 106 to generate as output a context vector 314 for the time step. Generating a context vector is described in more detail below with reference to step 606 of FIG. 6. The context vector generator 304 provides the context vector 314 for the time step to the substring score neural network 306.

The substring score neural network 306 receives as input the context vector 314 for the time step and the updated hidden state of the RNN 312 at the time step. The substring score neural network 306 processes the context vector 314 for the time step and the updated hidden state of the RNN 312 to generate as output a set of substring scores 316 for the time step. In some implementations, the substring score neural network 306 is a Multi-Layer Perceptron (MLP) with softmax outputs. Each substring score corresponds to a respective substring from a set of substrings. For example, as described above with reference to FIG. 1, the set of substrings may include a set of alphabetic letters which is used to write one or more natural languages, e.g., the English alphabet. The substring set may also include Arabic numerals, a space character, a comma character, a period character, an apostrophe character, and an unknown character. The score for a given substring represents a likelihood that the corresponding substring is the current substring at the time step in an output sequence that is a transcription of the utterance. Generating a set of substring scores for a particular time step is described in more detail below with reference to step 608 of FIG. 6.

The speech recognition system processes the substring scores 316 for each time step to determine a substring sequence that represents a transcription of an utterance, as described above with reference to FIG. 1. For example, for each time step, the speech recognition system may select the highest scoring substring from the set of substring scores to determine the sequence of substrings.

Figure 4:
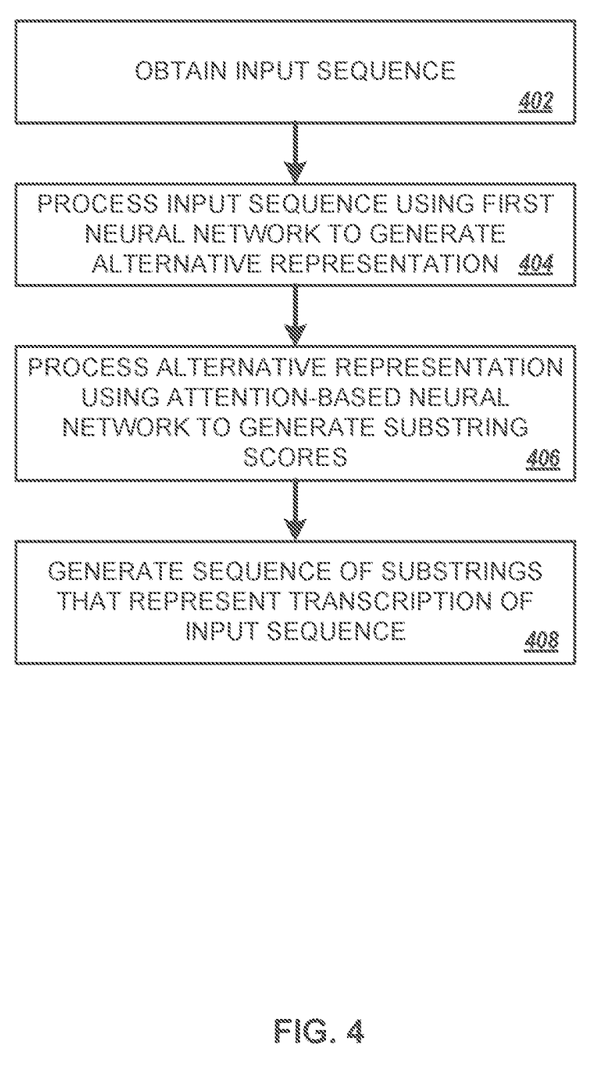
FIG. 4 is a flow diagram of an example process for processing an acoustic sequence using a speech recognition system.

FIG. 4 is a flow diagram of an example process 400 for processing an acoustic sequence using a speech recognition system. For convenience, the process 400 will be described as being performed by a system of one or more computers located in one or more locations. For example, a speech recognition system, e.g., the LAS speech recognition system 100 of FIG. 1, appropriately programmed, can perform the process 400.

The system obtains an input acoustic sequence (step 402). The acoustic sequence represents an utterance and includes a respective frame of data for each of a first number of time steps. Each frame of data is an acoustic feature representation of the utterance at the corresponding time step. An example input acoustic sequence of filter bank spectra features is given by Equation (2) below:

$$x = (x_1, x_2, \ldots, x_T) \quad (2)$$

The system processes the input acoustic sequence using a first neural network to convert the input acoustic sequence into an alternative representation for the input acoustic sequence (step 404). For example, the system may process the input acoustic sequence using an acoustic sequence encoder, e.g., a pyramid Bidirectional Long Short Term Memory (BLSTM) RNN as described in FIG. 2, to convert the input acoustic sequence into an alternative representation for the input acoustic sequence. The alternative representation for the input sequence includes a respective alternative acoustic feature representation for each of a second number of time steps, where the second number of time steps may be smaller than the first number of time steps. An example alternative representation for the input acoustic sequence is given by Equation (3) below.

$$h = (h_1, h_2, \ldots, h_U), U < T \quad (3)$$

Processing an acoustic sequence to convert the input sequence into an alternative representation for the input acoustic sequence is described in more detail below with reference to FIG. 5.

The system processes the alternative representation for the input acoustic sequence using an attention-based Recurrent Neural Network (RNN) to generate, for each position in an output sequence order, a set of substring scores that includes a respective substring score for each substring in a set of substrings (step 406). In some implementations a substring may include one or more characters. For example, the system may process the alternative representation for the input acoustic sequence using an attention-based substring decoder, e.g., the attention-based substring decoder 300 of FIG. 3, to generate, for each position in an output sequence order, a set of substring scores that includes a respective substring score for each substring in a set of substrings. The set of substrings may include a set of alphabetic letters which may be used to write one or more natural languages, e.g., the English alphabet and Arabic numerals {a, b, c, . . . , z, 0, . . . , 9,}. The set of substrings may also include a space character ⟨space⟩, a comma character ⟨comma⟩, a period character ⟨period⟩, an apostrophe character ⟨apostrophe⟩, and an unknown character ⟨unk⟩.

Processing an alternative representation of an acoustic sequence using an attention-based RNN to generate, for each position in an output sequence order, a substring output is described in more detail below with reference to FIG. 6.

The system generates a sequence of substrings that represent a transcription of the utterance (step 408). The generated sequence of substrings may begin with a start of sequence token ⟨sos⟩ and end with an end of sequence token ⟨eos⟩. An example sequence of substrings may be represented by Equation (5) below.

$$y = (\langle sos \rangle, y_1, \ldots, y_S, \langle eos \rangle), \quad (5)$$

where $y_i \in$ {a, b, c, . . . , z, 0, . . . , 9, ⟨space⟩, ⟨comma⟩, ⟨period⟩, ⟨apostrophe⟩, ⟨unk⟩}.

The process 400 can be performed to generate a substring sequence for an acoustic sequence for which the desired output is not known, i.e., for a received acoustic sequence for which the desired substring sequence is not known. The process 400 may also be performed to generate a substring sequence for a training acoustic sequence, i.e., an acoustic sequence for which the desired substring sequence is already known, as part of a training process to determine trained values of parameters of the attention-based speech recognition system, e.g., the speech recognition system 100 including the acoustic sequence encoder 104 and attention-based substring decoder 108 of FIG. 1. For example, during training, the speech recognition system can process a batch of training examples and generate a respective system output for each training example in the batch. The system outputs can then be used to adjust the values of the parameters of the speech recognition system using conventional neural network training techniques, e.g., a backpropagation through time training technique. The acoustic sequence encoder 104 and attention-based substring decoder 108 may be trained jointly for end-to-end speech recognition.

Figure 5:
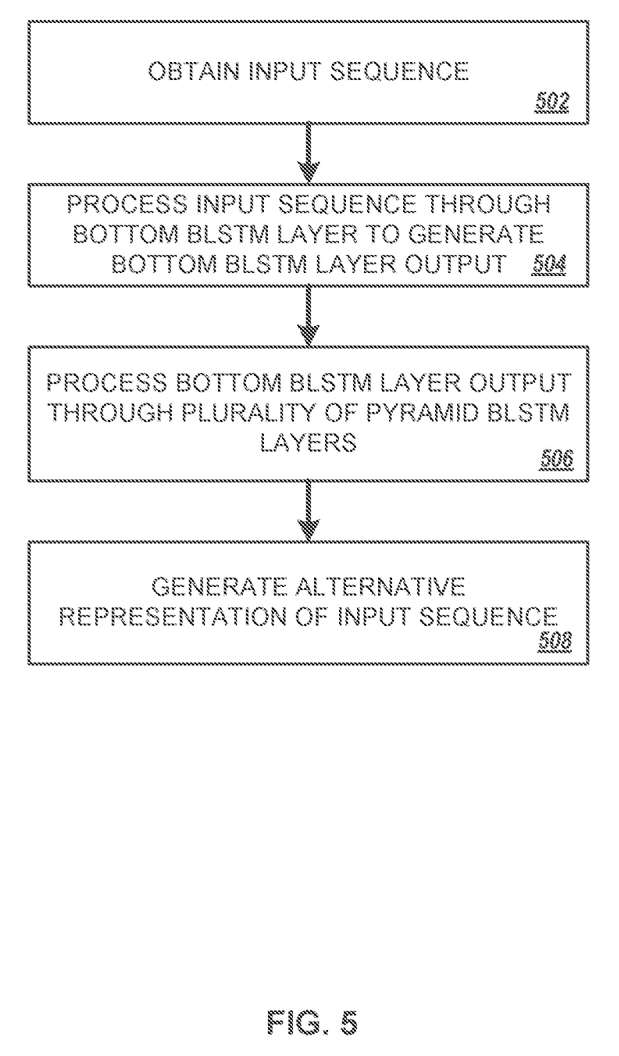
FIG. 5 is a flow diagram of an example process for processing an acoustic sequence using an acoustic sequence encoder.

FIG. 5 is a flow diagram of an example process 500 for processing an acoustic sequence using an acoustic sequence encoder. For convenience, the process 500 will be described as being performed by a system of one or more computers located in one or more locations. For example, an acoustic sequence encoder e.g., the pyramid Bidirectional Long Short Term Memory RNN of FIG. 2, appropriately programmed, can perform the process 500.

The acoustic sequence encoder obtains an input acoustic sequence (step 502). For example, the acoustic sequence encoder may obtain an input acoustic sequence as described in Equation (1) above with reference to step 402 of FIG. 4.

The acoustic sequence encoder processes the input acoustic sequence through a bottom BLSTM RNN layer to generate a bottom BLSTM RNN layer output (step 504). For example, the acoustic sequence encoder may process the input acoustic sequence through the bottom BLSTM RNN layer of the pyramid BLSTM RNN described in FIG. 2.

The acoustic sequence encoder processes the bottom BLSTM RNN layer output through each of a plurality of pyramid BLSTM layers (step 506). For example, the acoustic sequence encoder may process the bottom BLSTM RNN layer output through the pyramid BLSTM RNN layers of FIG. 2. In each successive stacked pyramid BLSTM layer, the time resolution may be reduced, e.g., by a factor of 2, by concatenating outputs at consecutive steps, as described above with reference to FIG. 2.

The acoustic sequence encoder generates an alternative representation of the input acoustic sequence (step 508). For example, the acoustic sequence encoder may use the output from the highest pBLSTM RNN layer as the alternative representation for the input acoustic sequence. The alternative representation for the input acoustic sequence may be represented as given by Equation (2) above with reference to step 404 of FIG. 4. The alternative representation may be provided to an attention-based substring decoder and used to generate a sequence of substrings that represent a transcription of the utterance, as described below with reference to FIG. 6.

Figure 6:
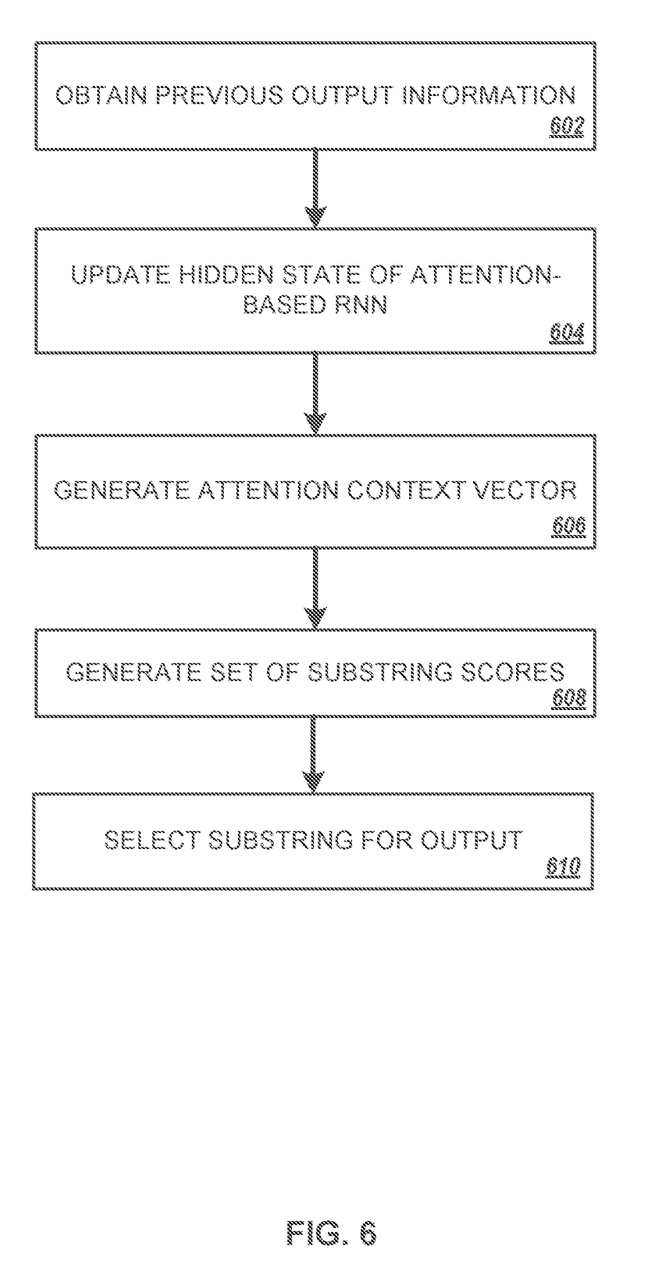
FIG. 6 is a flow diagram of an example process for generating a substring output using an attention-based substring decoder.

FIG. 6 is a flow diagram of an example process 600 for generating a substring output for a given position in an output sequence using an attention-based substring decoder. For convenience, the process 600 will be described as being performed by a system of one or more computers located in one or more locations. For example, a speech recognition system including an attention-based decoder, e.g., the LAS speech recognition system 100 of FIG. 1 including the attention-based decoder 300 of FIG. 3, appropriately programmed, can perform the process 600.

The system obtains information about a preceding position in the output sequence order (step 602). For example, to generate a substring output at a position in the output sequence order i, the system obtains the state of the attention-based RNN, e.g., RNN 302 of FIG. 3, the previously generated substring and the attention context vector at preceding position in the output sequence order i−1.

If the position in the output sequence order is the initial position, the system may obtain a placeholder start of sequence token, e.g., the <sos> character referenced above, a placeholder initial attention context vector and an initial hidden state of the attention-based RNN.

The system processes the substring at the preceding position in the output sequence order and the attention context vector for the preceding position in the order using the attention-based RNN to update the hidden state of the attention-based RNN from the hidden state for the preceding position to a hidden state for the position (step 604). As described in FIG. 3 above, the attention-based RNN is configured to receive as input the substring at the preceding position in the output sequence order and the attention context vector for the preceding position in the order and to update its internal hidden state.

If the position in the output sequence order is the initial output position, the attention-based substring decoder may update the initial hidden state of the attention-based RNN. For example, the attention-based substring decoder nay process the placeholder start of sequence token and the placeholder initial attention context vector using the attention-based RNN to update the hidden state of the attention-based RNN from the initial hidden state to a hidden state for the initial position in the output sequence order.

The system generates an attention context vector for the position from the alternative representation and the RNN hidden state for the position in the output sequence order (step 606). In some implementations, the system may generate an attention context vector for the position in the output sequence order i from the alternative representation h and the RNN hidden state $s_i$ for the position in the output sequence order by computing a scalar energy $e_{i,u}$ for each time step u in the alternative representation for the position. The system generates the scalar energy by processing the hidden state of the attention-based RNN $s_i$ using a first neural network, and processing the u-th time step of the alternative representation $h_u$ using a second neural network. In some implementations the first and second neural networks are Multi-Layer Perceptron (MLP) neural networks. The scalar energy may be given by Equation (9) below.

$$e_{i,u} = \langle \phi(s_i), \psi(h_u) \rangle \tag{9}$$

In Equation (9), $h_u \in h$ represents the time step u of h and $\phi, \psi$ are MLP networks.

The system may convert the computed scalar energy into a probability distribution, or attention $\alpha_{i,u}$, using a softmax function, as given by Equation (10) below.

$$\alpha_{i,u} = \frac{\exp(e_{i,u})}{\sum_u \exp(e_{i,u})} \tag{10}$$

The attention based substring decoder may use the probability distribution created from converting the computed scalar energy into a probability distribution to create an attention context vector $c_i$. In some implementations, the attention-based decoder creates an attention context vector by combining the alternative representation at different positions in the output sequence order, e.g., by linearly blending $h_u$ with the attention $\alpha_{i,u}$ as given by Equation (11) below.

$$c_i = \Sigma_u \alpha_{i,u} h_u \tag{11}$$

The attention model used by the attention-based substring decoder is content based—the contents of the RNN hidden state $s_i$ are matched to the contents of $h_u$ representing time step u of h, to generate an attention vector $\alpha_i$, and $\alpha_i$ is used to linearly blend vectors $h_u$ to create $c_i$. The attention context vector $c_i$ can be seen as a contiguous bag of weighted features of h.

The attention-based substring decoder generates a set of substring scores for the position in the output sequence order using the attention context vector for the position $c_i$, as generated in step 606, and the RNN hidden slate for the position $s_i$, as updated in step 604 (step 608). In some implementations, the attention-based substring decoder generates a set of substring scores by processing the RNN hidden state for the position $s_i$ and the attention context vector for the position $c_i$ using a neural network. In some implementations the neural network is a MLP with Soft max outputs over substrings.

The system selects a substring for the position in the output sequence order (step 610). For example, the attention-based substring decoder may select the highest scoring substring from the set of substring scores for the position generated in step 608 above as the substring at the position in the output sequence of substrings. If the end of sequence token ⟨eos⟩ is selected for the position in the output sequence order, the listen, attend and spell speech recognition system determines to end the substring sequence at the position in the output sequence order.

In some implementations, the attention-based decoder generates one or more additional output sequences by processing the alternative representation using a left to right beam search decoding. For example, during inference, the attention-based decoder may maintain a set of partial hypotheses, i.e., partial output sequences that start with a start-of-sentence token. At each time step, each partial hypothesis in the beam may be expanded with every possible substring and only the predetermined number of likely beams are kept. When an end-of-sentence token is encountered, the partial hypothesis may be removed from the beam, i.e., the system stops adding additional outputs to the partial hypothesis, and added to the set of complete hypotheses. The system can repeat these steps until each partial hypothesis has been finalized. The system can then select the final hypothesis from the set of complete hypotheses having the highest sequence score as the hypothesis for the input sequence or may output multiple of the finalized hypotheses as possible transcriptions of the input sequence. The beams may be rescored using language models trained on text corpora.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or tactile feedback, and input from the user can be received in any form, including, acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining, at a pyramid Bidirectional Long Short Term Memory (BLSTM) Recurrent Neural Network (RNN) executing on data processing hardware, an input sequence representing an utterance, the BLSTM RNN comprising:
        a bottom BLSTM layer configured to receive, as input, the input sequence representing the utterance;
        a first pyramid BLSTM layer configured to receive, as input, an output of the bottom BLSTM layer; and
        a second pyramid BLSTM layer configured to receive, as input, an output of the first pyramid BLSTM layer;
    at each of a first number of time steps, processing, using the bottom BLSTM layer, a respective feature representation of the input sequence to generate a respective bottom BLSTM layer output;
    processing, using the first pyramid BLSTM layer, the respective bottom BLSTM layer outputs generated for each of the first number of time steps to generate a sequence of first pyramid BLSTM layer outputs;
    at each of a second number of time steps:
        receiving, at the second pyramid BLSTM layer, a respective concatenation of consecutive first pyramid BLSTM layer outputs of the sequence of first pyramid BLSTM layer outputs generated using the first pyramid BLSTM layer; and
        processing, using the second pyramid BLSTM layer, the respective concatenation of consecutive first pyramid BLSTM layer outputs to generate a respective alternative feature representation for the corresponding time step of the second number of time steps;
    receiving, at an attention-based neural network executing on the data processing hardware, an alternative representation for the input sequence; and
    for each position in an output sequence, generating, using the attention-based neural network, a probability distribution over possible outputs by processing the alternative representation for the input sequence.

2. The method of claim 1, wherein the alternative representation for the input sequence comprises the respective alternative feature representation for each of the second number of time steps.

3. The method of claim 2, wherein the second number is smaller than the first number.

4. The method of claim 1, wherein processing the alternative representation for the input sequence using an attention-based neural network comprises, for an initial position in the output sequence order:
    processing a placeholder start of sequence token and a placeholder initial attention context vector using the attention-based neural network to update a hidden state of the attention-based neural network from an initial hidden state to a hidden state for the initial position in the output sequence order;
    generating an attention context vector for the initial position from the alternative representation and the hidden state for the initial position in the output sequence order; and
    generating the set of substring scores for the initial position using the attention context vector for the initial position and the hidden state for the initial position.

5. The method of claim 4, further comprising selecting, by the data processing hardware, the highest scoring possible output from the probability distribution of possible outputs at the initial position in the output sequence order.

6. The method of claim 1, wherein processing the alternative representation for the input sequence using the attention-based neural network comprises, for each position after an initial position in the output sequence order:
processing a substring at the preceding position in the output sequence order and the attention context vector for the preceding position in the order using the attention-based network to update the hidden state of the attention-based neural network from the hidden state for the preceding position to a hidden state for the position;
generating an attention context vector for the position from the alternative representation and the neural network hidden state for the position in the output sequence order; and
generating the set of substring scores for the position using the attention context vector for the position and the neural network hidden state for the position.

7. The method of claim 6, further comprising selecting, by the data processing hardware, the highest scoring substring from the set of substring scores for the position as the substring at the position in the output sequence of substrings.

8. The method of claim 6, wherein generating an attention context vector for the position from the alternative representation and the neural network hidden state for the position in the output sequence order comprises:
computing a scalar energy for the position using the alternative representation and the hidden state of the attention-based neural network for the position;
converting the computed scalar energy into a probability distribution using a softmax function; and
using the probability distribution to create a context vector by combining the alternative representation at different positions.

9. The method of claim 1, wherein the BLSTM RNN and the attention-based recurrent neural network are trained jointly.

10. The method of claim 1, wherein processing the alternative representation for the input sequence using the attention-based neural network comprises processing the alternative representation using the attention-based neural network using a left to right beam search decoding.

11. A system comprising:
data processing hardware; and
memory hardware in communication with the data processing hardware and storing instructions that when executed on the data processing hardware cause the data processing hardware to perform operations comprising:
obtaining, at a pyramid Bidirectional Long Short Term Memory (BLSTM) Recurrent Neural Network (RNN) executing on the data processing hardware, an input sequence representing an utterance, the BLSTM RNN comprising:
a bottom BLSTM layer configured to receive, as input, the input sequence representing the utterance;
a first pyramid BLSTM layer configured to receive, as input, an output of the bottom BLSTM layer; and
a second pyramid BLSTM layer configured to receive, as input, an output of the first pyramid BLSTM layer;
at each of a first number of time steps, processing, using the bottom BLSTM layer, a respective feature representation of the input sequence to generate a respective bottom BLSTM layer output;
processing, using the first pyramid BLSTM layer, the respective bottom BLSTM layer outputs generated for each of the first number of time steps to generate a sequence of first pyramid BLSTM layer outputs;
at each of a second number of time steps:
receiving, at the second pyramid BLSTM layer, a respective concatenation of consecutive first pyramid BLSTM layer outputs of the sequence of first pyramid BLSTM layer outputs generated using the first pyramid BLSTM layer; and
processing, using the second pyramid BLSTM layer, the respective concatenation of consecutive first pyramid BLSTM layer outputs to generate a respective alternative feature representation for the corresponding time step of the second number of time steps;
receiving, at an attention-based neural network executing on the data processing hardware, an alternative representation for the input sequence; and
for each position in an output sequence, generating, using the attention-based neural network, a probability distribution over possible outputs by processing the alternative representation for the input sequence.

12. The system of claim 11, wherein the alternative representation for the input sequence comprises the respective alternative feature representation for each of the second number of time steps.

13. The system of claim 12, wherein the second number is smaller than the first number.

14. The system of claim 11, wherein processing the alternative representation for the input sequence using an attention-based neural network comprises, for an initial position in the output sequence order:
processing a placeholder start of sequence token and a placeholder initial attention context vector using the attention-based neural network to update a hidden state of the attention-based neural network from an initial hidden state to a hidden state for the initial position in the output sequence order;
generating an attention context vector for the initial position from the alternative representation and the hidden state for the initial position in the output sequence order; and
generating the set of substring scores for the initial position using the attention context vector for the initial position and the hidden state for the initial position.

15. The system of claim 14, wherein the operations further comprise selecting the highest scoring possible output from the probability distribution of possible outputs at the initial position in the output sequence order.

16. The system of claim 11, wherein process ng the alternative representation for the input sequence using the attention-based neural network comprises, for each position after an initial position in the output sequence order:
processing a substring at the preceding position in the output sequence order and the attention context vector for the preceding position in the order using the attention-based network to update the hidden state of the attention-based neural network from the hidden state for the preceding position to a hidden state for the position;
generating an attention context vector for the position from the alternative representation and the neural network hidden state for the position in the output sequence order; and generating the set of substring scores for the position using the attention context vector for the position and the neural network hidden state for the position.

17. The system of claim 16, wherein the operations further comprise selecting the highest scoring substring from the set of substring scores for the position as the substring at the position in the output sequence of substrings.

18. The system of claim 16, wherein generating an attention context vector for the position from the alternative representation and the neural network hidden state for the position in the output sequence order comprises:
- computing a scalar energy for the position using the alternative representation and the hidden state of the attention-based neural network for the position;
- converting the computed scalar energy into a probability distribution using a softmax function; and
- using the probability distribution to create a context vector by combining the alternative representation at different positions.

19. The system of claim 11, wherein the BLSTM RNN and the attention-based recurrent neural network are trained jointly.

20. The system of claim 11, wherein processing the alternative representation for the input sequence using the attention-based neural network comprises processing the alternative representation using the attention-based neural network using a left to right beam search decoding.

* * * * *